United States Patent [19]
Chien et al.

[11] Patent Number: 5,621,467
[45] Date of Patent: Apr. 15, 1997

[54] TEMPORAL-SPATIAL ERROR CONCEALMENT APPARATUS AND METHOD FOR VIDEO SIGNAL PROCESSORS

[75] Inventors: Max Chien, Plainsboro; HuiFang Sun, Cranbury; Wilson Kwok, Plainsboro, all of N.J.

[73] Assignee: Thomson multimedia S.A., Courbevoie, France

[21] Appl. No.: 389,524

[22] Filed: Feb. 16, 1995

[51] Int. Cl.$^6$ .................................................. H04N 7/68
[52] U.S. Cl. ........................ 348/409; 348/420; 348/616
[58] Field of Search .................... 348/384, 390, 348/401, 403, 409, 411, 412, 413, 415, 416, 420, 405, 402, 616, 400; 382/275; 358/433

[56] References Cited

U.S. PATENT DOCUMENTS

| | | | |
|---|---|---|---|
| 5,142,537 | 8/1992 | Kutner et al. | 371/31 |
| 5,150,210 | 9/1992 | Hoshi et al. | 358/135 |
| 5,204,740 | 4/1993 | Ishii | 358/105 |
| 5,212,549 | 5/1993 | Ng et al. | 358/135 |
| 5,247,363 | 9/1993 | Sun et al. | 358/167 |
| 5,267,036 | 11/1993 | Habraken et al. | 358/133 |
| 5,365,604 | 11/1994 | Kwok et al. | 382/54 |
| 5,410,553 | 4/1995 | Choon | 348/409 |
| 5,442,400 | 9/1995 | Sun et al. | 348/409 |
| 5,450,506 | 9/1995 | Gillard et al. | 348/405 |
| 5,455,629 | 10/1995 | Sun et al. | 348/402 |

OTHER PUBLICATIONS

"*Manipulation and Compositing of MC–DCT Compressed Video*", by Shih–Fu Chang and David G. Messerschmitt, IEEE Journal on Selected Areas in Communications, vol. 13, No. 1, Jan. 1995.

"*A Modified Moment–Based Edge Operator for Rectangular Pixel Image*", by Li–Min Luo, Xiao–Hua Xie and Xu–Dong Bao, IEEE Transactions on Circuits and Systems for Video Technology, vol. 4, No. 6, Dec. 1994, pp. 552–554.

*Primary Examiner*—Amelia Au
*Attorney, Agent, or Firm*—Joseph S. Tripoli; Eric P. Herrmann; Ronald H. Kurdyla

[57] ABSTRACT

A video decompression system includes block error concealment means for generating substitute data for lost blocks of pixel data. An interpolator generates both spatially and temporally interpolated or predicted blocks of data for concealing a lost block. Pixel data in the respective blocks of spatially and interpolated data are transformed to coefficients representing frequency spectra. A substitute block of coefficients is assembled from coefficients from both the transformed blocks, according to a predetermined criteria. The substitute block is transformed back to the spatial domain for substitution of lost pixel values.

19 Claims, 5 Drawing Sheets

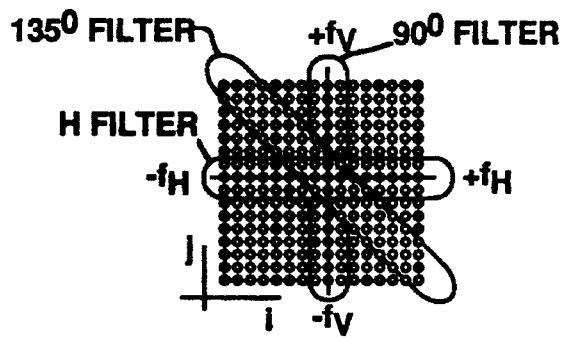
FIG. 5
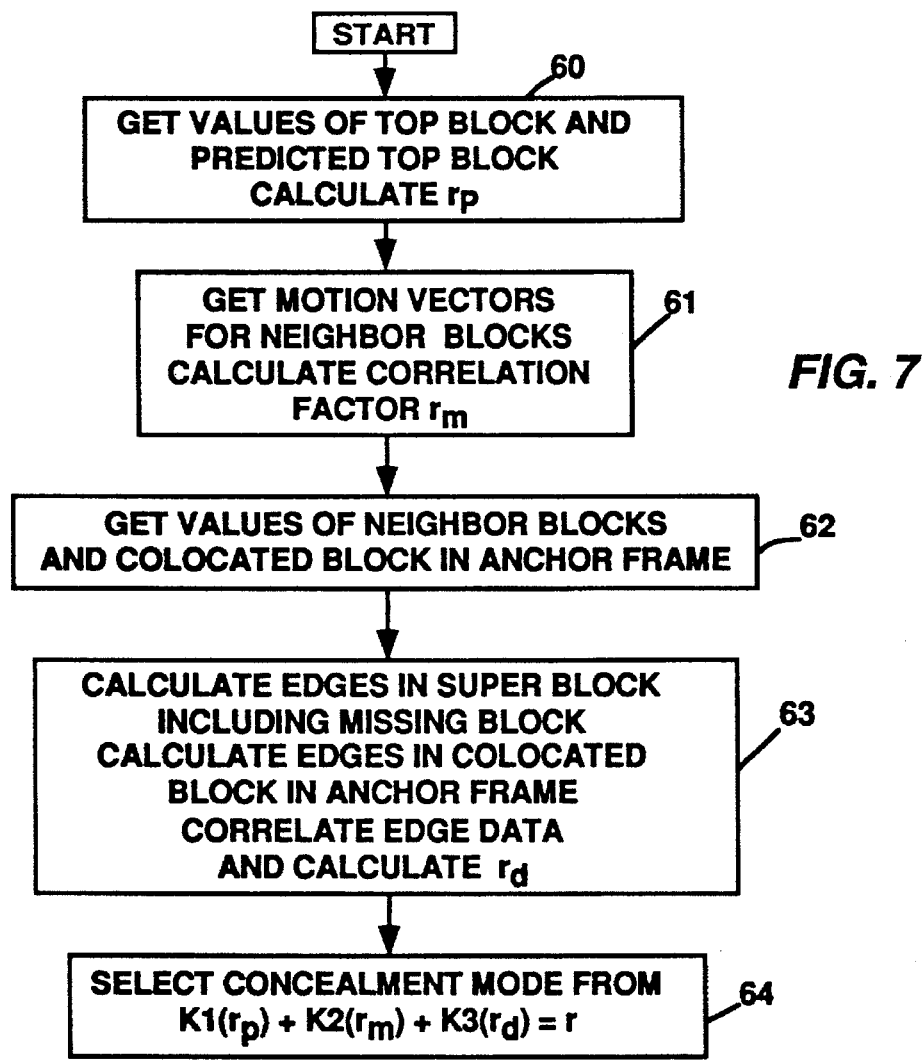
FIG. 6
FIG. 7

100
TEMPORAL-SPATIAL ERROR CONCEALMENT APPARATUS AND METHOD FOR VIDEO SIGNAL PROCESSORS

This invention relates to error concealment apparatus for replacing damaged or lost two dimensional blocks of pixel values in reproduced images.

BACKGROUND OF THE INVENTION

In video signal transmission systems of the type which compress video data on a block basis as for example systems which utilize discrete cosine transforms, data loss and/or data damage frequently occurs on a block basis (e.g. a 16×16 array of pixels). These transmission systems normally do not support enough overhead to correct all errors, but rather depend on error concealment techniques to provide substitute data which closely approximates the lost data. Werner Keesen et. al. in U.S. Pat. No. 4,807,033 issued 21 Feb. 1989, disclose an error concealment system for replacing two dimensional blocks of image data. This system includes apparatus for detecting blocks of lost data and replacing the lost image data in the spatial domain with pixel values generated from surrounding pixels by interpolation. The surrounding pixels are examined to determine the existence of image edges (gradients) and thereafter interpolation is performed to generate a block of pixel values to replace the lost or damaged block of pixel values.

Directional interpolation, as used herein, is the process of generating pixel values by performing interpolation which favors a particular direction. Refer to FIG. 1 where the respective squares or blocks represent respective image areas forming the basis of block based compression. The dots within the respective squares or blocks represent pixel values, in this instance representing white or black image points. The center block which is void of dots represents a damaged block for which substitute pixels are to be generated. If for example, pairs of pixels within the two rows of pixels circumscribing the central block are appropriately examined, existing image gradients may be determined as for example the diagonal white line passing through blocks B1 and B9. Then, based on the gradient information, interpolation is performed in the direction of the dominant detected gradients. In the Figure, the pixels which fall on a given arrow are generated from pixels in the adjacent blocks and occurring along extensions of the respective arrows.

The Keesen et. al apparatus detects image gradient information and for single gradients performs one directional interpolation. If more than one strong gradient is detected, a directional interpolation is performed for each of the strong gradients and the arithmetic sum of the respective directionally interpolated blocks of pixels is utilized as the substitute block.

Summing the respective interpolated blocks of pixels gives respective pixel values equal weight and tends to blur image features. Consider a gray image containing a horizontal white line behind a vertical black line. Vertical interpolation will generate a block of gray pixels including the vertical black line. Horizontal interpolation will generate a block of gray pixels including the horizontal white line. The arithmetic average of these interpolated blocks will be a block of gray pixels including a lighter than black vertical line and a darker than white horizontal line, with a gray area at the intersection of the lines.

SUMMARY OF THE INVENTION

The present invention is an improvement over the Keesen et. al. error concealment apparatus and includes block error concealment means for generating substitute data for lost blocks. An interpolation apparatus generates both spatially and temporally interpolated or predicted blocks of data for concealing a lost block. Pixel data in the respective blocks of spatially and interpolated data are transformed to coefficients representing frequency spectra. A substitute block of coefficients is assembled from coefficients from both the transformed blocks, according to a predetermined criteria. The substitute block is transformed back to the spatial domain for substitution of lost pixel values.

In a particular embodiment, the relative correlation of parameters in blocks adjacent a missing block is determined. If the relative correlation falls within a predetermined range, the foregoing substitute block is utilized for block error concealment. On the other hand, if the relative correlation exceeds or is less than the range, then the temporally predicted block and the spatially interpolated block are utilized for block error concealment respectively.

BRIEF DESCRIPTION OF THE DRAWINGS

FIG. 5 is a pictorial representation of transform coefficients useful in describing a method for determining dominant image edges or direction, and describing directional spatial interpolation.

FIG. 6 is a pictorial diagram indicating the location of blocks from which motion vectors are accessed for evaluation of image motion.

FIG. 7 is a flow chart showing the operation of the apparatus of FIG. 4.

DETAILED DESCRIPTION

In order to perform block based error concealment it is necessary to be able to determine lost or damaged blocks of signal. To this end it is assumed that the transmitted signal to be processed in the exemplary embodiments is formatted in transport packets. Each packet includes a header, a payload, and continuity and/or check bytes. The header includes sufficient information to identify the spatial locations, in the reproduced image, of the respective blocks of compressed video data carried in the payload. The check bytes may be of a form to permit error detection of substantially all potential errors and at least partial error correction. An example of this type of signal format may be found in U.S. Pat. No. 5,247,363. Of course there are other known methods for detecting lost blocks which may also be implemented.

Figure 1:
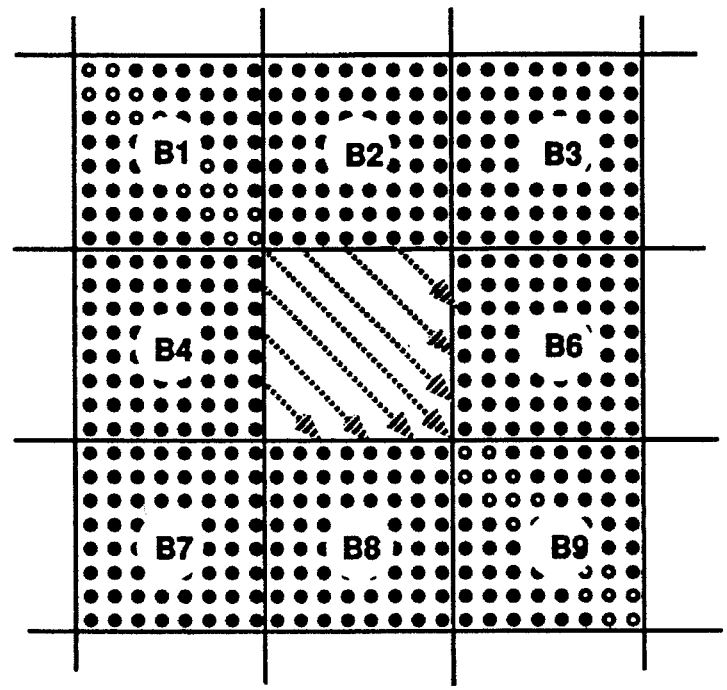
FIG. 1 is a pictorial representation of a portion of the blocks of pixel values representing an image, which representation is useful in describing the invention.
Figure 2:
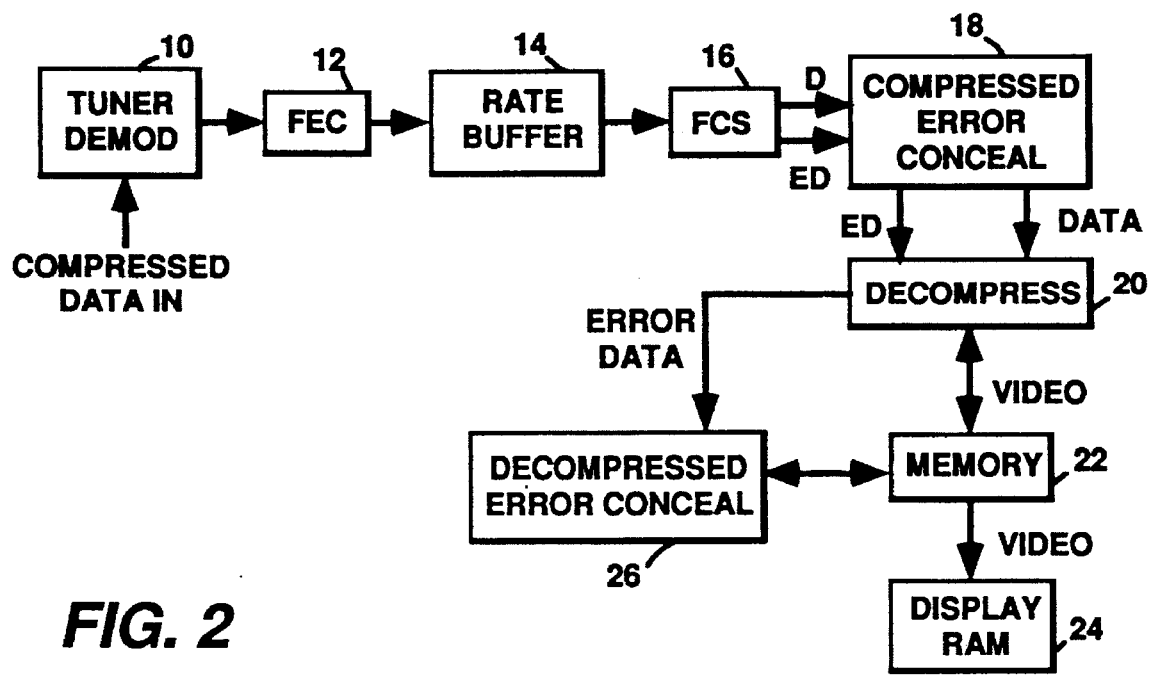
FIG. 2 is a block diagram of apparatus for decompressing video signal and including block based error concealment apparatus embodying the present invention.

Refer to FIG. 2 which illustrates a general form of a receiver for processing the above described signals. Transmitted signals, from for example, an antenna (not shown) are applied to a tuner/demodulator 10, which provides baseband signal. The baseband signal is applied to a forward error correction, FEC, decoder 12, which examines the transmitted signal and corrects errors incurred in the transmission channel, according to its error correction capability. Error corrected data from the FEC decoder 12 is applied to a rate buffer 14 which accepts data at a relatively constant rate from the FEC decoder 12 and outputs data on demand to the subsequent processing elements. Data from the buffer is coupled to a frame check sequence, FCS, decoder 16, which examines the error corrected data for uncorrected errors according to FCS check bits (or continuity check count values, for example) appended to the transport packets.

The FCS decoder 16 passes transport packets, D, to element 18 along with an error signal, ED, indicating whether respective transport packets contain data errors. Element 18, responsive to the error data, discards transport packets which include data errors. Error free transport packets are separated into video data and transport header data. The transport header data and error data, ED, are utilized to determine what data is lost. For more specific information regarding these processes the reader is invited to examine U.S. patent application (RCA 86409A) Ser. No. 08/017,455, filed Feb. 12, 1993, and entitled "APPARATUS FOR CONCEALING ERRORS IN A DIGITAL VIDEO PROCESSING SYSTEM". Element 18 passes the error free video data and the error tokens ED to the decompressor 20. The error tokens may provide several functions. For example, the particular error token may condition the decompressor to simply skip over lost blocks in particular frame types. In this instance, decompressed data from the prior frame is simply repeated from the collocated image area, i.e., a form of temporal interpolation or block replacement. Alternatively, other error tokens are passed to a further error concealment processor 26.

The decompressor 20 utilizes frames of memory 22 in the decompression process. This memory may be arranged to store frames of both compressed and decoded video signal for use in the process of motion compensated predictive decoding, and error concealment. Decoded image information is subsequently transferred to a display memory 24 from which it may be accessed in raster format for display. The decompressor in this arrangement is conditioned to store decoded motion vectors, for at least a portion of a frame, in the memory 22 for use in error concealment.

The error concealment element 26 interacts with the data in memory 22, and generates substitute image data for blocks of pixel values identified by the error tokens. Luminance and chrominance signal components are decompressed separately but by similar processes and then recombined for display. The following discussion regarding error concealment is directed to concealment of errors in the luminance component. Errors in the chrominance components may be concealed in similar fashion by similar parallel apparatus not shown. However, parameter evaluation may be performed on a single signal component (e.g. luminance) and the results of the evaluation used for determining the type of block error concealment for all components.

Figure 3:
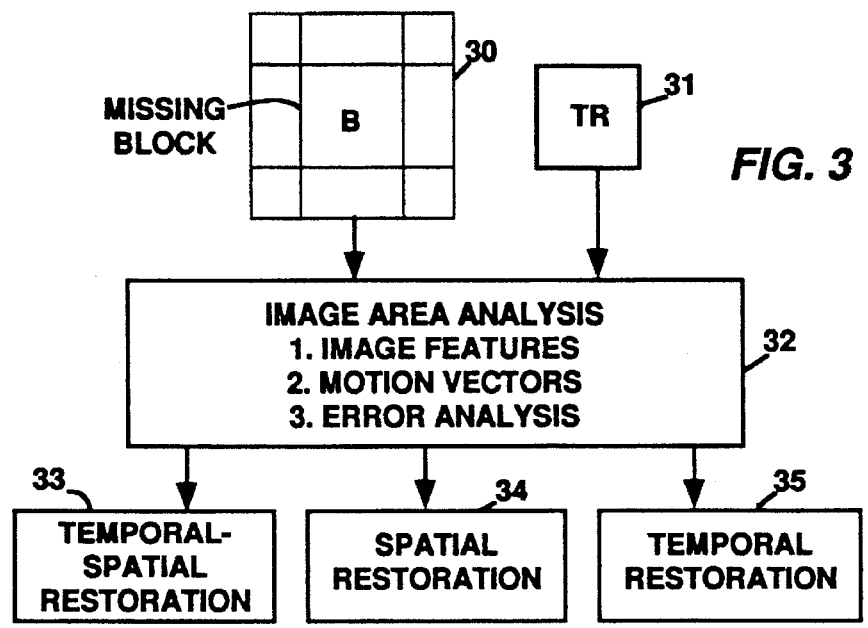
FIG. 3 is a pictorial representation of the process of error concealment use in the present invention.

FIG. 3 shows pictorially the functions of one embodiment of the error concealment apparatus 26 of FIG. 2. In FIG. 3, blocks 30 and 31 represent memory from which decompressed data may be accessed. The data from element 30 is data which surrounds the lost block B. The data, TR, from element 31, preferably is a temporal prediction of the lost block using motion vectors from the block vertically above the lost block to determine the predicted values. Alternatively, block TR may represent data from a prior frame collocated with block B. It should be realized that the blocks to the right and left of block B may also be lost or missing if they were contained in the same transport block. However, even if this were the case, the block to the left of block B may be a replacement block if the system performs error concealment from left to right, in which case only the block to the right of block B will also be missing. The data from elements 30 and 31 are evaluated to determine the mode of error concealment to be executed for the missing block B. In order to facilitate this evaluation, it may be beneficial to first replace the missing data of block B and possibly the blocks to the fight and left of block B (if they too are missing) with some predetermined value, representing gray for example, or possibly with the average brightness level of the block TR.

Two or three types of image evaluation are executed 32, to determine the concealment mode to be performed. A first evaluation is for image motion. An example of image motion evaluation, to be described below, looks at the magnitude and relative correlation of the motion vectors for the blocks above and below the missing block. A second evaluation is of dominant image features such as edges or gradients. An example of edge evaluation, to be described below, determines dominant edges in the area surrounding the lost block B, and dominant edges in the collocated block TR, and also examines the correlation between the edges in blocks B and TR. A third evaluation takes a general measure of image differences between an area of the current frame being decoded and a collocated area of a prior frame. From the foregoing evaluations a closeness measure is derived, and depending upon the relative value of this measure one of three modes of error concealment is performed.

The first mode of concealment, 35, executed when high correlation exists between the current and the prior frame is simple temporal replacement of the lost block B with a temporally predicted block, TR. A second mode of replacement, 34, executed when low correlation is indicated by the closeness measure, is concealment by spatial interpolation. The interpolation in this instance is directional, according to the direction of the dominant edge or edges determined in the neighboring image areas. A third mode of replacement, 33 combines the prior two modes. The combining is performed in the spatial frequency domain wherein frequency components of the dominant edge are non-additively combined with frequency components of the block TR exclusive of the frequency components representing the edge. These combined frequency components are inverse transformed to generate concealment data for the lost block.

This type of error concealment process permits of a very advantageous trade off between generating high resolution replacement blocks and blocks with reduced artifacts in the presence of motion, through the range of images with no motion and images with significant motion. The combination of spatial and temporal interpolation for images having intermediate correlation, advantageously provides foreground images with lesser resolution but also with lesser motion artifacts and background images with high spatial resolution tending to give the entire substitute image block the appearance of high spatial resolution.

Figure 4:
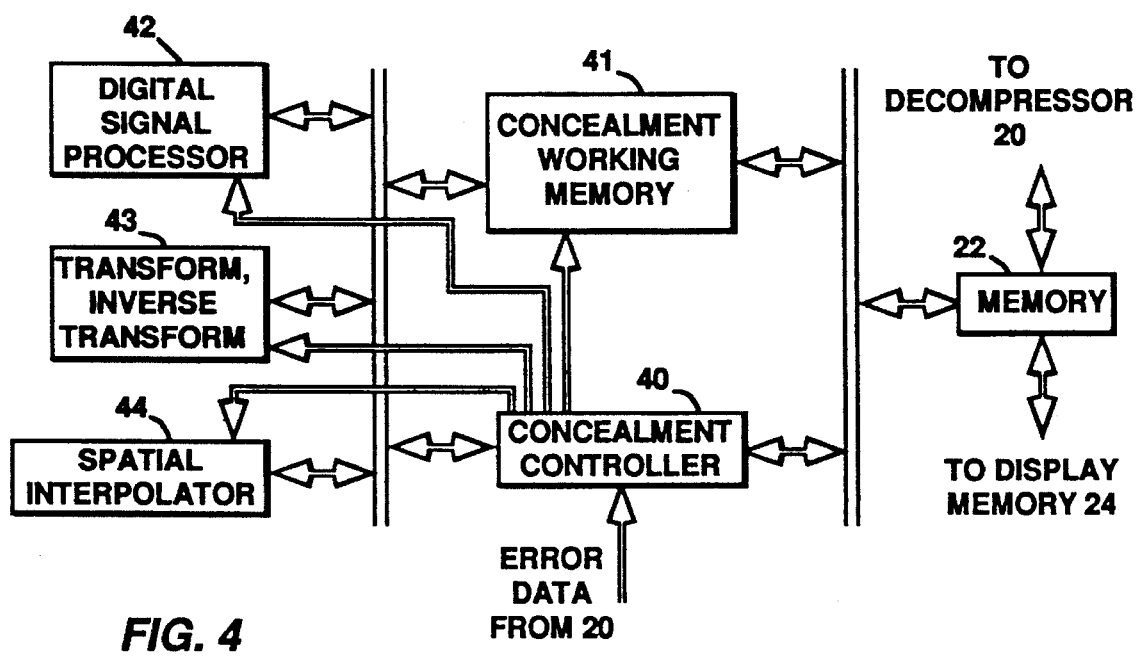
FIG. 4 is block diagram of exemplary concealment apparatus which may be implemented for element 26 of FIG. 2.

FIG. 4 illustrates, in block diagram form, exemplary error concealment apparatus. The illustrated functions may be programmed into the software of a special purpose processor such as the CLM4100 Multimedia Accelerator available from C-Cube Microsystems, Milpitas, Calif. 95035, or they may be realized by individual circuit elements as indicated. The apparatus includes element 43 designated as a transform, inverse transform device. The transform, and inverse transform will be described in terms of a Fast Fourier Transform, FFT, and Inverse Fast Fourier Transform, IFFT respectively. However it will be appreciated by those skilled in the art of signal processing that other transforms may be used, in particular the Discrete Cosine Transform, DCT and its inverse, IDCT for example.

In FIG. 4 error data from the decompressor 20 triggers a concealment controller 40, which may be a microprocessor, to generate interpolated data for a lost block of data. In furtherance of this process, controller 40 accesses motion vectors and decompressed image data which surrounds the lost block from the memory 22, and collocated data from the prior image frame corresponding to block TR. This data may be transferred to a working memory 41, to preclude, at least in part, memory access contention in memory 22 during the concealment processing operations.

The image analysis is performed by the digital signal processor 42 under control of the concealment controller 40. The digital signal processor may be of the type TMS320 series of DSP's available from Texas Instruments Inc., Dallas, Tex., for example. Appropriate image data is accessed from the working memory to perform the edge or gradient analysis for the image area surrounding the lost block. For example, if the lost block contains a matrix of N by N pixels, a superblock of 2N by 2N pixels, with the lost block in its center, may be accessed from memory 41. The lost pixel data may be substituted with a mid gray value prior to analysis. The dominant gradient of the superblock is determined, and its angle, Theta(M) is recorded. The predicted block (TR) of pixel values from, for example, the prior frame or closest anchor frame, is accessed from the memory 41 and applied to the digital signal processor 42 for gradient analysis. The dominant gradient of the block (TR) is determined, and its angle, Theta(T) is recorded. The values Theta(M) and Theta(T) are then applied to the digital signal processor for correlation according to the function;

$$r_d = \cos(\text{Theta}(M) - \text{Theta}(T))$$

where $r_d$ is designated an image gradient correlation measure.

In the spatial domain, the DSP 42 is programmed to determine significant image gradients represented by the pixels surrounding the lost block, and then to select the top one or two gradient directions that tend to identify the predominant local image contours (or most strongly characterize image edge orientations).

Image edges or gradients may be determined as follows. The local edge gradients $g_x$ and $g_y$ for a respective pixel location $x(i,j)$, are computed from the equations:

$$g_x = x_{i-1,j+1} - x_{i-1,j-1} + x_{i,j+1} + x_{i,j-1} + x_{i+1,j+1} - x_{i+1,j-1} \quad (1)$$

$$g_y = x_{i+1,j-1} - x_{i-1,j-1} + x_{i+1,j} - x_{i-1,j} + x_{i+1,j+1} - x_{i-1,j+1} \quad (2)$$

This is equivalent to applying the following 3×3 Prewitt convolutional mask operators:

$$g_x = \begin{bmatrix} -1 & 0 & 1 \\ -1 & 0 & 1 \\ -1 & 0 & 1 \end{bmatrix} \quad g_y = \begin{bmatrix} -1 & -1 & -1 \\ 0 & 0 & 0 \\ 1 & 1 & 1 \end{bmatrix}$$

The magnitude, G, and angular direction, $\Phi$, of the gradient at (i,j) are given by:

$$G = \sqrt{g_x^2 + g_y^2} \quad \Phi = \tan^{-1}(g_y/g_x) \quad (3)$$

These gradient measures are computed for each (i,j) coordinate in the neighborhood surrounding the missing or damaged block. The value of the respective gradient angles are rounded to the nearest 22.5 degrees, for example, and thus corresponds to one of eight directional categories D1–D8. If a line drawn through a respective (i,j) neighborhood pixel coordinate with the direction determined by the gradient angle will pass through the missing block, that particular (i,j) pixel coordinate is given a vote. The directional categories D1–D8 of the voting coordinates are mutually exclusively accumulated by summing the magnitudes of the associated directional gradients. That is, the magnitudes of the voting coordinates having directional category D1 are accumulated to form one sum, the magnitudes of the voting coordinates having directional category D2 are accumulated to form a second sum and so on. The directional categories exhibiting the largest accumulated sums determine pixel interpolation directions.

An alternative method of detecting gradient information will be described with reference to FIG. 5. The circles in FIG. 5 represent FFT coefficient values for a superblock, arranged in relation to a vertical frequency axis, $f_V$, and a horizontal frequency axis, $f_H$. The coefficients represent spatial frequency coefficients for an image and in this example correspond to a 16 by 16 pixel matrix. The coefficient at the intersection of the $f_V$ and $f_H$ axes corresponds to DC or the average brightness level over the matrix. Coefficients to the right of the vertical axis $f_V$ represent increasing horizontal frequencies and coefficients above the horizontal axis $f_H$ represent increasing vertical frequencies. Coefficients to the left of the vertical axis and below the horizontal axis represent the conjugates of the foregoing frequency components.

In FIG. 5 exemplary coefficient groupings designated 135° FILTER, 90° FILTER and H FILTER are shown. The coefficients in the group designated H FILTER include selected coefficients which correspond generally to horizontal image gradients. The coefficients in the group designated 90° FILTER include selected coefficients which correspond generally to vertical image gradients. The coefficients in the group designated 135° FILTER include selected coefficients which correspond generally to image gradients at 135 degrees to the horizontal etc. Therefore, it may be seen that respective groupings can be arranged for a plurality of image gradient directions. To determine the dominant image gradient direction, one need only sum the coefficients in the respective groupings (each of which represents a particular direction), normalize the sums and compare the respective normalized sums to determine the largest normalized sum. The angle Theta(M) associated with the group having the largest normalized sum is the dominant image gradient.

Gradient analysis may be performed on the superblock by applying the appropriate pixel data from memory 41 to the transform apparatus 43 to generate the corresponding coefficients which will be stored in the memory 41 for the above described analysis, which may be performed in the digital signal processor (DSP) 42. The image gradients of the predicted block TR may be similarly determined by transforming the pixel data of block TR in element 43, storing the coefficients in memory 41 and analyzing respective groupings of coefficients. If this method of gradient analysis is utilized, the transform coefficients will be retained in memory for further processing described below.

Image motion analysis is also performed. An exemplary motion analysis generates six motion vector correlation measures and forms the weighted average of the six as a directional magnitude correlation measure $r_m$. The motion vectors utilized in the analysis are the vectors associated with the blocks designated TOP−1, TOP, TOP+1, BOT−1, BOT, and BOT+1, located above and below the missing block as shown in FIG. 6. Note, for MPEG data, motion vectors are associated with macroblocks which include a matrix of 2 by 2 luminance representative blocks each representing a matrix of 8 by 8 pixels. If block replacement (concealment) is performed on 8 by 8 pixel units, one directional magnitude correlation will serve four blocks. However, since in the MPEG environment it is unlikely that only one block of a macroblock will be lost, but rather that all blocks of respective macroblocks will be concurrently lost, all analysis will be made on a macroblock basis and concealment will be performed on a macroblock basis. It should be assumed that for an MPEG environment that the blocks drawn in FIG. 6 represent macroblocks.

The motion vectors associated with the blocks neighboring the lost block are accessed from the memory 41 and applied to the DSP 42. The DSP 42 is conditioned by the controller 40 to calculate the following correlation factors:

$$r_1 = \frac{V_{TOP} * V_{TOP-1}}{|V_{TOP}||V_{TOP-1}|}$$

$$r_2 = \frac{V_{TOP} * V_{TOP+1}}{|V_{TOP}||V_{TOP+1}|}$$

$$r_3 = \frac{V_{BOT} * V_{BOT-1}}{|V_{BOT}||V_{BOT-1}|}$$

$$r_4 = \frac{V_{BOT} * V_{BOT+1}}{|V_{BOT}||V_{BOT+1}|}$$

$$r_5 = \frac{V_{BOT} * V_{TOP}}{|V_{BOT}||V_{TOP}|}$$

where $V_{(i)}$ is the motion vector associated with block i. For example $V_{BOT-1}$ is the motion vector associated with block BOT−1. The directional magnitude correlation measure $r_m$ is generated according to the relation;

$$r_m = (K1)\text{Max}(r_5, 0) + (K2)\text{Max}(\text{Max}(r_1,r_2),0) + (K3)\text{Max}(\text{Max}(r_1,r_2),0) + (K4)r_6.$$

Exemplary values for constants K1–K4 are 0.6, 0.15, 0.15 and 0.1 respectively. Note that to lessen computations $r_m$ may be calculated, with only slight loss in effectiveness, using only $r_1$, $r_2$, and $r_5$ with appropriate K scale factors.

The foregoing vector analysis assumes that respective blocks have motion vectors of similar form. However the MPEG compressed video signal protocol supports blocks without motion vectors (I frames), blocks with forward motion vectors (P frames) and blocks with forward and backward motion vectors (B frames), and frames with admixtures of each type of motion vector. The foregoing motion vector correlation analysis only makes sense if the respective pairs of macroblocks having motion vectors included in each of the equations $r_1$–$r_6$ are of the same type. Therefor a test is performed on the respective pairs of motion vectors before inclusion in the equations. The tests may be performed by the controller 40 or the DSP 42 or a combination of both.

Figure 8:
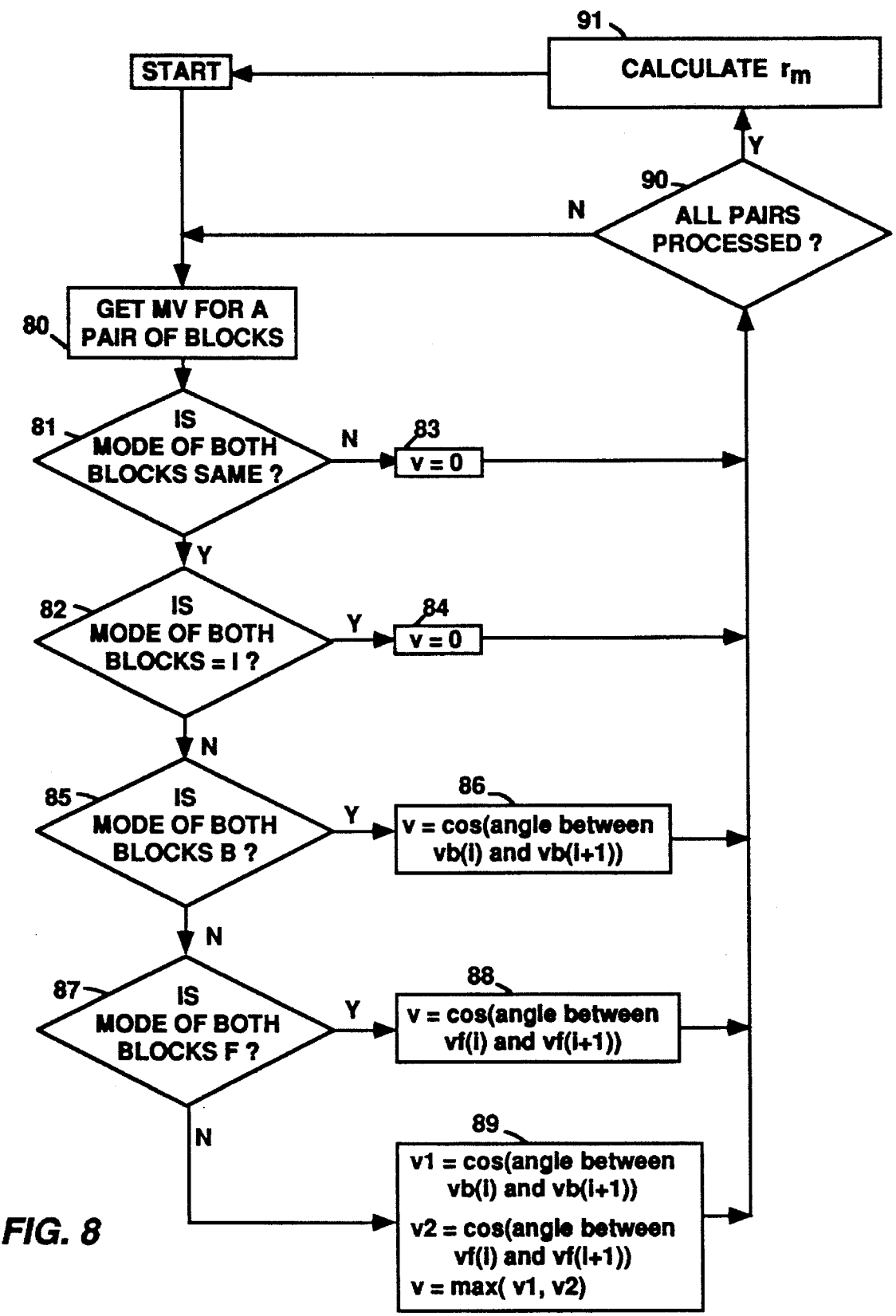
FIG. 8 is a flow chart, illustrating in part, the process 61 of FIG. 7.

An alternative motion vector correlation calculation, considering the possibilities of different types of motion vectors, is illustrated in FIG. 8. In FIG. 8, the block types of pairs of the blocks illustrated in FIG. 6 are accessed {80}. The blocks are tested {81} to determine if they include the same type of vectors. If they do not, the vector correlation v(n) for the pair of blocks is set to zero {83}. If the blocks contain the same type of vectors, they are tested {82} to determine if they are both I blocks. If they are, they do not contain vectors and the vector correlation v(n) for that pair of blocks is set to zero {84}. If the pair of blocks are not both I blocks {82}, they are tested {85} to determine whether they both contain backward vectors. If they do, a vector correlation v(n) is calculated {86} according to the equation v(n)=cos(angle between vb(i) and vb(i+1))

where vb(i) and vb(i+1) correspond to the backward vectors from blocks (i) and (i+1) respectively.

If at {85} the blocks do not both contain backward vectors, a test is made {87} to determine if both blocks contain only forward vectors. If they do, a vector correlation v(n) is calculated {88} according to the equation;

v(n)=cos(angle between vf(i) and vf(i+1))

where vf(i) and vf(i+1) correspond to the forward vectors from blocks (i) and (i+1) respectively.

If both blocks do not contain only forward or only backward vectors at this juncture they must both contain both forward and backward vectors. A vector correlation v1 is calculated for the backward pair of vectors and a vector correlation v2 is calculated for the pair of forward vectors, where v1=cos(angle between vb(i) and vb(i+1)); and v2=cos(angle between vf(i) and vf(i+1)).

The vector correlation v(n) for the pair of blocks is the larger of v1 and v2 {89}. After each pair of blocks (for example TOP, TOP−1; TOP, TOP+1; BOT, BOT−1; BOT, BOT+1; BOT, TOP as illustrated in FIG. 6) is examined and a corresponding vector correlation is determined, a check is made {90} to determine if all desired pairs of blocks (or macroblocks) have been processed. If they have not, the next pair is accessed {80} and processed. If they have all been processed a correlation measure $r_m$ is generated according to the equation;

$$r_m = \sum_{1}^{N} K(n)v(n)$$

where K(n) for forward and backward types are the same value, but K(n) for a v(n) associated with a pair of blocks containing both forward and backward vectors is larger.

The temporal correlation measure or error analysis, $r_p$, is performed according to the equation;

$$r_p = \frac{\left(\frac{\sum_{j=0}^{15}\sum_{i=0}^{15} TOP_{ij}TOPP_{ij}}{16}\right) - \frac{\sum_{i=0}^{15} TOP_{ij}}{16}\frac{\sum_{j=0}^{15} TOPP_{ij}}{16}}{STD(TOP)STD(TOPP)}$$

where $TOP_{ij}$ refers to the pixel values in the block above the missing block assuming a block of 16 by 16 pixels, $TOPP_{ij}$ refers to the pixel values for a predicted block corresponding to the block above the missing block, and STD stands for standard deviation. In determining the predicted block TOPP, the motion vectors from block TOP are used unless the block TOP is an I type block, in which case a zero valued motion vector is used. The calculation for $r_p$ may be performed in either the DSP 42, the controller 40, or a combination of both.

The same calculation may be made for the lower block BOT and its temporal prediction BOTP or only the first calculation may be performed as desired. If a calculation is performed for both the top (TOP) and bottom (BOT) blocks the larger of the $r_p$ values is selected as the temporal correlation measure $r_p$.

The different correlation measures $r_p$, $r_m$, and $r_d$ are added to generate a general correlation parameter r, according to the relation;

$$r=\beta1(r_p)+\beta2(r_d)+\beta3(r_m)$$

where β1, β2, and β3 are constants having exemplary values of 0.6, 0.2 and 0.2 respectively. Error concealment mode is determined by the relative magnitude of r. If r is greater than a threshold TH1, indicating a high degree of neighboring image correlation, concealment of the missing block is by temporal replacement using a predicted block from a prior frame. If r is less than a threshold TH2, (TH2<TH1) indicating relatively low neighboring image correlation, concealment of the missing block is by substituting a block generated by spatial interpolation. If TH2 ≦r≦TH1 concealment is by a combination of spatial interpolation and temporal replacement to be discussed below. Exemplary values of TH1 and TH2 are 0.9 and 0.4 respectively.

It is not necessary to calculate and utilize all three of the correlation measures and acceptable results may still be achieved using for example only two of the correlation measures. Alternatively other correlation values/measures may be added to the mix forming the value r. In addition one or the other of the coefficients β1, β2 and β3 may be set to zero.

The foregoing processes are reviewed in the flowchart of FIG. 7. It will be appreciated that the order of determining the coefficient measures $r_m$, $r_p$, and $r_d$ is interchangeable. In FIG. 7 the measure $r_p$ is first calculated {60}. Then the appropriate motion vectors are accessed and the correlation measure $r_m$ is determined {61}. The pixel values for blocks neighboring a lost block are accessed {62} and the edge gradients $r_d$ are determined {63}. The respective measures $r_p$, $r_m$ and $r_d$ are weighted and summed to generate the correlation measure of the spatially and temporally surrounding blocks {64}.

The value of the correlation parameter r is compared to two threshold values TH1 and TH2 in the concealment controller 40. If r is greater than TH1 a substitute block for the bad or missing block is generated by temporal replacement. This is performed in the controller 40, by substituting the block TR for the missing block in the display portion of memory 22, for the current frame period. If the value r is less than TH2, then concealment is by substituting a spatially interpolated block. This may be performed by accessing the superblock from the working memory 41, and applying this pixel matrix to the spatial interpolator 44. The interpolator 44 may generate a substitute block by known interpolation methods, including directional or bidirectional spatial interpolation in accordance with the directions of the dominant image gradient or gradients. Alternatively, if TH2 ≦r≦TH1, concealment is accomplished with a combination of spatial and temporal interpolation, which will be described with reference to FIG. 9.

Figure 9:
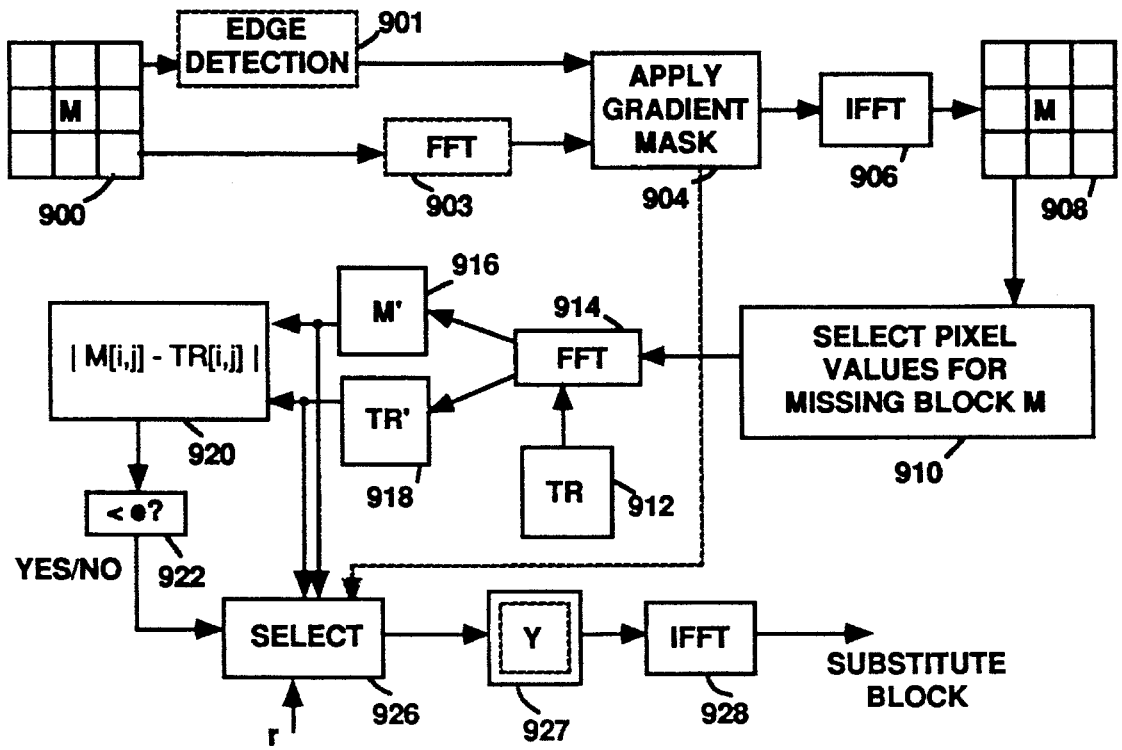
FIG. 9 is a block diagram of apparatus for generating combined spatio-temporal interpolated error concealment blocks.

In FIG. 9 the block 900 corresponds to the superblock previously discussed for generating the dominant edges or gradients. Element 901 represents apparatus for detecting the dominant edges or gradients. Indicia indicating the direction of the dominant edges are applied to a gradient mask 904. The superblock is applied to an FFT 903, and the transform coefficients generated by the FFT are applied to the gradient mask 904. Mask 904, responsive to the indicia from the detector 901, selects only those coefficients associated with the dominant edges. Referring to FIG. 5, if the dominant edge is at 135 degrees, the gradient mask 904 will form a superblock coefficient matrix comprising those coefficients which fall within the group designated 135° FILTER (in FIG. 5), and with the remaining coefficients set to zero values. This matrix is applied to an inverse FFT 906 and the coefficients are transformed to generate a superblock spatial pixel matrix 908. (Item 908 represents a portion of working memory 41, FFT 903 and IFFT 906 correspond to element 43 in FIG. 4 and the gradient mask may be realized by appropriate programming of controller 40.) The superblock is applied to a selector 910 which extracts the matrix of pixels corresponding to the missing block. That is, the pixel values of the superblock which form part of the neighboring blocks are eliminated leaving only the missing block M. This block M corresponds to a directionally filtered block and may be utilized as the spatially interpolated substitute block when such substitution mode is signaled by the parameter r. For the current purposes, the block M is applied to the FFT 914 which generates transformed block M' (916). In addition the predicted block TR from a prior frame is accessed from memory 912, and applied to the FFT 914 which generates the transformed block TR' (918). Respective FFT coefficients of blocks M' and TR' are applied to a subtractor 920 which forms a matrix of the absolute values of the differences of the respective corresponding coefficients. The respective differences |M'[i,j]–TR'[i,j]| are compared against a variable "e" in a comparator 922. The output of the comparator 922 controls a selector 926 which forms a matrix of coefficients Y[i,j] (927) from the coefficients in block M' and TR'. If the difference corresponding to coefficient [i,j] is less than or equal to "e", the selector 926 is conditioned to select the M[i,j] coefficient in block M' for use as the Y[i,j] coefficient. Alternatively, if the difference corresponding to coefficient [i,j] is greater than "e", the selector 926 is conditioned to select the TR[i,j] coefficient in block TR' for use as the respective Y[i,j] coefficient. The Y[i,j] matrix is applied to an inverse FFT element 928 which generates the substitute block of pixel values. This matrix may be returned to the memory 900 and the process iterated if desired. (Note, the elements 910 and 926 may be subsumed in element 40 of FIG. 4, elements 920 and 922 may be subsumed in element 42, and elements 914 and 928 may be subsumed in element 43.)

The dashed box in the block 927 is meant to indicate that the coefficients of the block Y[i,j] may be low pass filtered. Low pass filtering may be accomplished simply by ignoring or excising the higher frequency coefficients in the respective blocks. The low pass filtering may be performed as part of the selection process in the selector 926 and may be made dependent upon the value of the correlation measure r. Low pass filtering as a function of r advantageously lessens potential artifacts arising from images having lesser spatial and temporal correlation. Larger values of r would impose little or no filtering and smaller values of r would impose greater filtering. Alternatively the filtering may be performed at the FFT 914, to lessen the amount of processing required of elements 920 and 922. In this instance the blocks M' and TR' will be independently but similarly filtered.

The selector 926 may also be arranged to perform the selection of the respective blocks of data dependent upon the value of r. That is, the selector may include a comparator to compare r against the threshold values TH1 and TH2, and select blocks M' or TR' or a combination of M' and TR' according to the relative magnitude of r.

Figure 10:
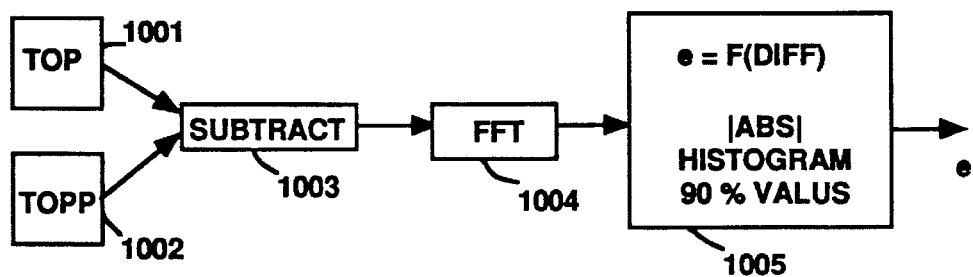
FIG. 10 is a block diagram of apparatus for calculating a variable parameter "e" used in the FIG. 9 apparatus.

The variable "e" may be a preprogrammed constant or a value selected by the user. Alternatively, it may be generated automatically as a function of the signal. One mode of generating the variable "e" automatically is illustrated in FIG. 10. In FIG. 10 the respective pixel values of the current block TOP (1001) and the predicted top block TOPP (1002) are applied to a subtractor 1003 which generates a matrix of difference values. These difference values are transformed in a two dimensional FFT 1004 and applied to element 1005 which generates the variable "e" as a function of the differences (here as a function of the transform coefficients of the difference values F(DIFF). An exemplary function F(DIFF), is to set variable "e" equal to the 90% value of the transform coefficients of the difference values. Alternatively variable e may be set equal to the value of one standard deviation $\sigma$ of the coefficients weighted by a scale factor $\delta$ which may be determined empirically via experiment.

$$e = \delta \text{ times } \sigma$$

Another value for F(DIFF)=e may be the weighted value of the mean, m, of the coefficients.

$$e = K4 \text{ times } m$$

where K4 is a constant determined by experiment. Using values of "e" which are a function of the video signal for determining the selection of the respective Y[i,j] coefficients in the substitute block has the advantage of minimizing errors where there are large correlative differences between correlative changes in the image.

An alternative mode of generating the temporal-spatial interpolated substitute block is suggested in part by the dashed line from the gradient mask to the selector 926. In this mode the selector 926 is conditioned by the dominant gradient to form a matrix Y[i,j] by selecting from block M', only the M[i,j] coefficients corresponding to those representing the dominant gradient, and selecting coefficients from block TR' to provide the remaining coefficient values.

What is claimed is:

1. Apparatus for generating substitute blocks of pixel data for missing or corrupted blocks of pixel data, comprising:

a source of pixel data representing respective images and a source of error data indicating blocks of said pixel data that may be missing or corrupted (hereinafter designated bad pixel data);

a controller, responsive to said error data, for accessing from said source, pixel data located spatially adjacent to a block of bad pixel data, and a temporally predicted block of data corresponding to said block of bad pixel data;

an interpolator operative upon said pixel data located spatially adjacent to a block of bad pixel data, for generating a spatially interpolated block of pixel data;

transform circuitry for providing a matrix of transform coefficients representing said spatially interpolated block of pixel data, and for generating a further matrix of transform coefficients representing said temporally predicted block of data;

a selector, responsive to a predetermined criteria, for forming a still further matrix of transform coefficients, by selecting respective coefficients in said still further matrix exclusively from said matrix of transform coefficients representing said spatially interpolated block, or from said further matrix of transform coefficients in accordance with said criteria; and inverse transform circuitry for inverse transforming said still further matrix to generate said substitute block of pixel data.

2. The apparatus set forth in claim 1 wherein said interpolator includes digital signal processing apparatus operative upon said pixel data located spatially adjacent to a block of bad pixel data for detecting a direction of a dominant image gradient within an image area represented by pixel data located spatially adjacent to a block of bad pixel data.

3. The apparatus set forth in claim 2 wherein said selector for forming a still further matrix, generates a matrix of transform coefficients including transform coefficients which represent directional image information corresponding to said dominant image gradient from said matrix of transform coefficients representing said spatially interpolated block, and selects transform coefficients from said further matrix of coefficients exclusive of coefficients which represent directional information corresponding to a dominant edge gradient.

4. Apparatus for generating substitute blocks of pixel data for missing or corrupted blocks of pixel data, comprising:

a source of pixel data representing respective images and a source of error data indicating blocks of said pixel data that may be missing or corrupted (hereinafter designated bad pixel data);

a controller, responsive to said error data, for accessing from said source, pixel data located spatially adjacent to a block of bad pixel data, and temporally predicted block of data corresponding to said block of bad pixel data;

an interpolator operative upon said pixel data located spatially adjacent to a block of bad pixel data, for generating a spatially interpolated block of pixel data;

transform circuitry for providing a matrix of transform coefficients representing said spatially interpolated block of pixel data, and for generating a further matrix of transform coefficients representing said temporally predicted block of data;

a selector for forming a still further matrix of transform coefficients, including circuitry for determining respective differences between corresponding transform coefficients in said matrix of transform coefficients representing said spatially interpolated block of pixel data, and in said further matrix of transform coefficients;

a comparator for comparing respective differences to a predetermined variable "e";

wherein said selector selects a corresponding coefficient from said matrix of transform coefficients representing said spatially interpolated block of pixel data, when the corresponding difference is less than said variable "e", and selects a corresponding coefficient from said further matrix of transform coefficients when the corresponding difference is greater than the variable "e"; and inverse transform circuitry for inverse transforming said still further matrix to generate said substitute block of pixel data.

5. The apparatus set forth in claim 4 wherein said selector further includes means for generating said variable "e" from image information located adjacent said bad pixel data.

6. The apparatus set forth in claim 4 further comprising:

apparatus responsive to data representing image information of image areas adjacent said block of bad pixel data, for determining a measure, r, of correlation of image features in said image areas adjacent said block of bad pixel data;

a source of threshold value TH1;

a comparator for comparing said correlation measure r against the threshold value TH1 and conditioning said selector to select coefficients only from said further matrix if the correlation measure, r, is greater than TH1, and conditioning said selector to select coefficients according to said predetermined criteria if the correlation measure, r is less than TH1.

7. The apparatus set forth in claim 6 further comprising:

a source of a further threshold value TH2 where TH2 is less than TH1; and wherein said comparator is arranged to compare said correlation measure, r, against said further threshold value TH2, and to condition said selector to select coefficients only from said matrix of transform coefficients representing said spatially interpolated block of pixel data if the correlation measure, r, is less than TH2, and conditioning said selector to select coefficients according to said predetermined criteria if TH2<r<TH1.

8. Apparatus for generating substitute blocks of pixel data for missing or corrupted blocks of pixel data, comprising:

a source of pixel data representing respective images and a source of error data indicating blocks of said pixel data that may be missing or corrupted (hereinafter designated bad pixel data);

a controller, responsive to said error data, for accessing from said source, pixel data located spatially adjacent to a block of bad pixel data, and a temporally predicated block of data corresponding to said block of bad pixel data;

an interpolator operative upon said pixel data located spatially adjacent to a block of bad pixel data, for generating a spatially interpolated block of pixel data;

transform circuitry for providing a matrix of transform coefficients representing said spatially interpolated block of pixel data, and for generating a further matrix of transform coefficients representing said temporally predicted block of data;

a selector for forming a still further matrix of transform coefficients, by selecting respective coefficients in said still further matrix exclusively from said matrix of transform coefficients representing said spatially interpolated block, or from said further matrix of transform coefficients;

apparatus responsive to data representing image information of image areas adjacent said block of bad pixel data, for determining a measure, r, of correlation of image features in said image areas adjacent said block of bad pixel data;

a source of threshold value TH1;

means for producing a block of substitute pixel data;

a comparator for comparing said correlation measure r against the threshold value TH1 and conditioning said means for producing a block of substitute pixel data to provide said temporally predicted block of data, if the correlation measure, r, is greater than TH1, and to provide a block of data from said selector if the correlation measure, r is less than TH1;

inverse transform circuitry for inverse transforming said still further matrix to generate said substitute block of pixel data.

9. The apparatus set forth in claim 8 further comprising:

a source of a threshold value TH2 where TH2 is less than TH1; and wherein said comparator is arranged for comparing said correlation measure, r, against said further threshold value TH2, and conditioning said means for producing a block of substitute pixel data to provide said spatially interpolated block of pixel data if the correlation measure, r, is less than TH2, and to provide a block of data from said selector if TH2<r<TH1.

10. The apparatus set forth in claim 8 wherein said apparatus responsive to data representing image information of image areas adjacent said block of bad pixel data, for determining a measure, r, of correlation of image features, comprises:

apparatus for determining at least the relative correlation of image gradients in blocks of pixel data adjacent said block of bad pixel data.

11. The apparatus set forth in claim 10 wherein said apparatus responsive to data representing image information of image areas adjacent said block of bad pixel data, for determining a measure, r, of correlation of image features, further comprises:

apparatus for determining the relative correlation of image motion in blocks of pixel data adjacent said block of bad pixel data; and apparatus for providing the weighted sum of values representing said relative correlation of image motion and said relative correlation of image gradients to generate said correlation measure, r.

12. The apparatus set forth in claim 11 wherein said apparatus responsive to data representing image information of image areas adjacent said block of bad pixel data, for determining a measure, r, of correlation of image features, further comprises:

means for determining a temporal correlation measure between a block adjacent said block of bad pixel data and a block corresponding to a predicted block of a block adjacent said block of bad pixel data; and apparatus for providing the weighted sum of values representing said relative correlation of image motion, said relative correlation of image gradients and said temporal correlation measure, to generate said correlation measure, r.

13. The apparatus set forth in claim 11 wherein said apparatus for determining the relative correlation of image motion includes apparatus for calculating the relative correlation of motion vectors associated with blocks of compressed video data adjacent said block of bad pixel data.

14. Apparatus for generating a substitute block of video data for a block of missing of corrupt video data in a video decompression system, comprising;

a source of blocks of said video data, and a source of error tokens respective ones of which indicate blocks of missing or corrupt block of pixel data;

an interpolator, responsive to said error tokens, for generating a spatially interpolated block of data from video data spatially adjacent said block of missing or corrupt pixel data, and for generating a temporally predicted block of pixel data corresponding to said block of missing or corrupt pixel data;

a processor responsive to video data spatially adjacent said block of missing or corrupt data for determining:
 a) dominant image gradients in video data spatially adjacent said block of missing or corrupt data;
 b) transform coefficients representing frequency spectra of said spatially interpolated block of data;
 c) transform coefficients representing frequency spectra of said temporally predicted block of pixel data; and said processor also forming a selected block of transform coefficients corresponding to said substitute block by selecting respective coefficients from said transform coefficients representing frequency spectra of said spatially interpolated block of data, and said transform coefficients representing frequency spectra of said temporally predicted block of pixel data according to a predetermined criteria; and inverse transforming the selected block of transform coefficients.

15. Apparatus for generating a substitute block of video data for a block of missing of corrupt video data in a video decompression system, comprising:

a source of blocks of said video data, and a source of error tokens respective ones of which indicate blocks of missing or corrupt block of pixel data;

an interpolator, responsive to said error tokens, for generating a spatially interpolated block of data from video data spatially adjacent said block of missing or corrupt pixel data, and for generating a temporally predicted block of pixel data corresponding to said block of missing or corrupt pixel data;

a processor responsive to video data spatially adjacent said block of missing or corrupt data for determining:
 a) dominant image gradients in video data spatially adjacent said block of missing or corrupt data;
 b) transform coefficients representing frequency spectra of said spatially interpolated block of data;
 c) transform coefficients representing frequency spectra of said temporally predicted block of pixel data; and
said processor also forming a selected block of transform coefficients corresponding to said substitute block by selecting respective coefficients from said transform coefficients representing frequency spectra of said spatially interpolated block of data, and said transform coefficients representing frequency spectra of said temporally predicted block of pixel data according to a predetermined criteria; and inverse transforming the selected block of transform coefficients;

a processor for generating a measure of correlation between respective blocks of pixel data located adjacent said block of missing or corrupt pixel data;

means for providing as a said substitute block of pixel data, said temporally predicted block of pixel data if the measure of correlation exceeds a first predetermined value, said spatially interpolated block of data if the measure of correlation is less than a second predetermined value less than said first predetermined value, and inverse transformed said selected block, if the measure of correlation lies between said first and second predetermined values.

16. A method for generating a block of pixel data for a missing or corrupt block of pixel data (hereafter bad block), comprising;

providing blocks of pixel data and an error signal indicating which of said blocks are bad blocks;

determining a dominant image gradient in blocks of pixels adjacent a bad block;

spatially interpolating, in accordance with said dominant image gradient, a substitute block of data for said bad block in response to said error signal;

temporally predicting a substitute block of data for said bad block in response to said error signal;

converting the spatially interpolated substitute block to a block of transform coefficients, TC1, representing frequency spectra;

converting the temporally predicted substitute block to a block of transform coefficients, TC2, representing frequency spectra;

forming a further block of coefficients by selecting respective coefficients from said blocks of transform coefficients TC1 and TC2 according to a predetermined criteria;

inverse transforming said further block of coefficients to produce a substitute block of pixel data.

17. The method set forth in claim 16 where in the step of selecting comprises:

selecting from said block of transform coefficients TC1, only coefficients representing image information along the dominant gradient; and selecting from the block of transform coefficients TC2, the remaining coefficients.

18. The method set forth in claim 16 where in the step of selecting comprises:

providing an error value "e";

determining differences between corresponding coefficients in the blocks of transform coefficients TC1 and TC2; and if the respective difference is less than the error value "e", selecting the coefficient from the block of transform coefficients TC1, else selecting the respective coefficient from the block of transform coefficients TC2.

19. The method set forth in claim 18 wherein the step of providing the value "e", comprises:

providing a block of data adjacent the bad block, and a temporally predicted block corresponding to said block of data adjacent said bad block;

determining differences between corresponding data in said temporally predicted block and the corresponding block; and statistically analyzing the differences and generating the value "e" from a statistic of the differences.

\* \* \* \* \*